US011509757B2

(12) United States Patent
Labrie

(10) Patent No.: US 11,509,757 B2
(45) Date of Patent: *Nov. 22, 2022

(54) WIRELESS INTERNET MONITORING APPLICATION

(71) Applicant: Martin Labrie, Montreal (CA)

(72) Inventor: Martin Labrie, Montreal (CA)

(73) Assignee: Martin Labrie, Montreal (CA)

( * ) Notice: Subject to any disclaimer, the term of this patent is extended or adjusted under 35 U.S.C. 154(b) by 48 days.

This patent is subject to a terminal disclaimer.

(21) Appl. No.: 17/238,517

(22) Filed: Apr. 23, 2021

(65) Prior Publication Data

US 2021/0243292 A1    Aug. 5, 2021

Related U.S. Application Data

(63) Continuation-in-part of application No. 17/161,833, filed on Jan. 29, 2021, which is a continuation of application No. 16/705,796, filed on Dec. 6, 2019, now Pat. No. 10,938,972.

(51) Int. Cl.
*H04W 24/00* (2009.01)
*H04M 1/72403* (2021.01)
*H04W 24/06* (2009.01)
*H04W 24/10* (2009.01)
*H04W 4/02* (2018.01)

(52) U.S. Cl.
CPC ......... *H04M 1/72403* (2021.01); *H04W 4/02* (2013.01); *H04W 24/06* (2013.01); *H04W 24/10* (2013.01)

(58) Field of Classification Search
CPC ... H04M 1/72403; H04W 4/02; H04W 24/06; H04W 24/10

USPC ....................................... 455/456.3
See application file for complete search history.

(56) References Cited

U.S. PATENT DOCUMENTS

| 7,471,956 | B2 * | 12/2008 | Byford | ............... | H04W 4/02 455/67.7 |
| 7,764,954 | B2 * | 7/2010 | Beyer, Jr. | ............ | G01C 21/3896 455/457 |
| 8,417,239 | B1 * | 4/2013 | DeCusatis | ............. | H04W 24/10 370/332 |
| 8,452,353 | B2 * | 5/2013 | Crawford | .......... | H04W 52/0258 455/343.1 |
| 8,589,230 | B1 * | 11/2013 | Bickerstaff | ........ | G06Q 30/0251 705/14.63 |

(Continued)

OTHER PUBLICATIONS

Office Action for corresponding Canadian Patent Application No. 3,101,128.

*Primary Examiner* — Amancio Gonzalez
(74) *Attorney, Agent, or Firm* — Stratford Group Ltd.

(57) ABSTRACT

A wireless internet monitoring system comprising an application on a plurality of mobile devices recording the strength of a wireless internet signal received at a mobile device along with a GPS coordinates of the mobile device at time of said recording, wherein said application transmits the monitored signal strength along with said GPS coordinates to a backend application executed on a server. The backend application consolidates the monitored signal strength and said GPS coordinates with one or more previously monitored signal strength and GPS coordinate and preparing a geographical map of the monitored signal strength to be displayed by the application on the mobile device.

6 Claims, 5 Drawing Sheets

(56) References Cited

U.S. PATENT DOCUMENTS

| | | | |
|---|---|---|---|
| 8,837,370 B2* | 9/2014 | Mohammed | H04W 24/08 |
| | | | 455/511 |
| 8,838,586 B2* | 9/2014 | Waldman | G06Q 30/02 |
| | | | 707/724 |
| 9,078,099 B2* | 7/2015 | Farley | G01S 5/0252 |
| 9,451,451 B2* | 9/2016 | Chow | H04W 28/0215 |
| 9,565,625 B1 | 2/2017 | Macneille et al. | |
| 9,698,897 B2* | 7/2017 | Harrang | H04B 7/2606 |
| 9,846,525 B2* | 12/2017 | Saulnier | H04L 67/12 |
| 10,036,642 B2 | 7/2018 | Ross et al. | |
| 10,073,179 B2* | 9/2018 | Driscoll | G01S 19/396 |
| 10,075,387 B1 | 9/2018 | Avasol | |
| 10,142,961 B2 | 11/2018 | Rao et al. | |
| 10,165,059 B2* | 12/2018 | Haney | H04M 1/0202 |
| 10,198,398 B2 | 2/2019 | Hofstaedter et al. | |
| 10,243,604 B2 | 3/2019 | Ross et al. | |
| 10,440,675 B2* | 10/2019 | Socaciu | H04W 64/00 |
| 2004/0243307 A1* | 12/2004 | Geelen | G01C 21/3635 |
| | | | 342/357.31 |
| 2009/0247186 A1* | 10/2009 | Ji | G01S 5/0226 |
| | | | 455/456.1 |
| 2014/0357302 A1 | 12/2014 | Wilbur | |
| 2015/0181449 A1* | 6/2015 | Didenko | H04W 24/10 |
| | | | 455/67.11 |
| 2016/0277939 A1 | 9/2016 | Bertrand et al. | |
| 2017/0061655 A1 | 3/2017 | Pylappan et al. | |
| 2018/0293595 A1* | 10/2018 | McMaster | G01C 21/3626 |
| 2018/0332557 A1* | 11/2018 | Vuornos | H04W 4/50 |
| 2019/0200267 A1* | 6/2019 | Meredith | H04W 36/22 |
| 2019/0369202 A1* | 12/2019 | Smith | G01S 11/06 |

* cited by examiner

```
┌─────────────────────────┐
│   CONSOLIDATE DATA 302  │
└─────────────────────────┘

┌─────────────────────────┐
│     MERGE DATA 304      │
└─────────────────────────┘

┌─────────────────────────┐
│   UPDATE HEAT MAP 306   │
└─────────────────────────┘
```

FIG. 3

WIRELESS INTERNET MONITORING APPLICATION

CROSS-REFERENCE TO RELATED APPLICATIONS

This application is a continuation-in-part of U.S. patent application Ser. No. 17/161,833, filed Jan. 29, 2021, which is a continuation of U.S. patent application Ser. No. 16/705,796, filed Dec. 6, 2019, now U.S. Pat. No. 10,938,972, the contents of which are incorporated entirely herein by reference.

BACKGROUND

Wireless internet service quality varies greatly as a function of the distance to the wireless internet towers and other factors.

Many applications on mobile devices require wireless internet availability. There is a need to know where wireless internet service is available and what quality can be achieved. There is a need for this information to be continuously updated by as many users as possible to maintain an up to date map of wireless internet service quality for one or more service provider.

Wireless internet service includes, but is not limited to, cellular data service (3G, LTE, 4G, 5G), long range WIFI services such as city-wide or highway WIFI, satellite internet over 5G.

BRIEF SUMMARY

A wireless internet monitoring system is disclosed comprising an application on a plurality of mobile devices recording the strength of a wireless internet signal received at one of said mobile device along with a GPS coordinates of said one mobile device at time of said recording, wherein said application transmits the monitored signal strength along with said GPS coordinates to a backend application and said backend application executed on a server consolidating the monitored signal strength and said GPS coordinates with one or more previously monitored signal strength and GPS coordinate and preparing a geographical map of the monitored signal strength to be displayed by the application on the mobile device.

In another embodiment, the wireless internet monitoring system performs an internet test to evaluate internet connectivity when said monitored signal strength is below a predetermined threshold and wherein said internet test may comprise accessing a web page and accessing an application on the backend and receiving a response.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates how the data is consolidated and presented to the user;

DETAILED DESCRIPTION

Figure 1:
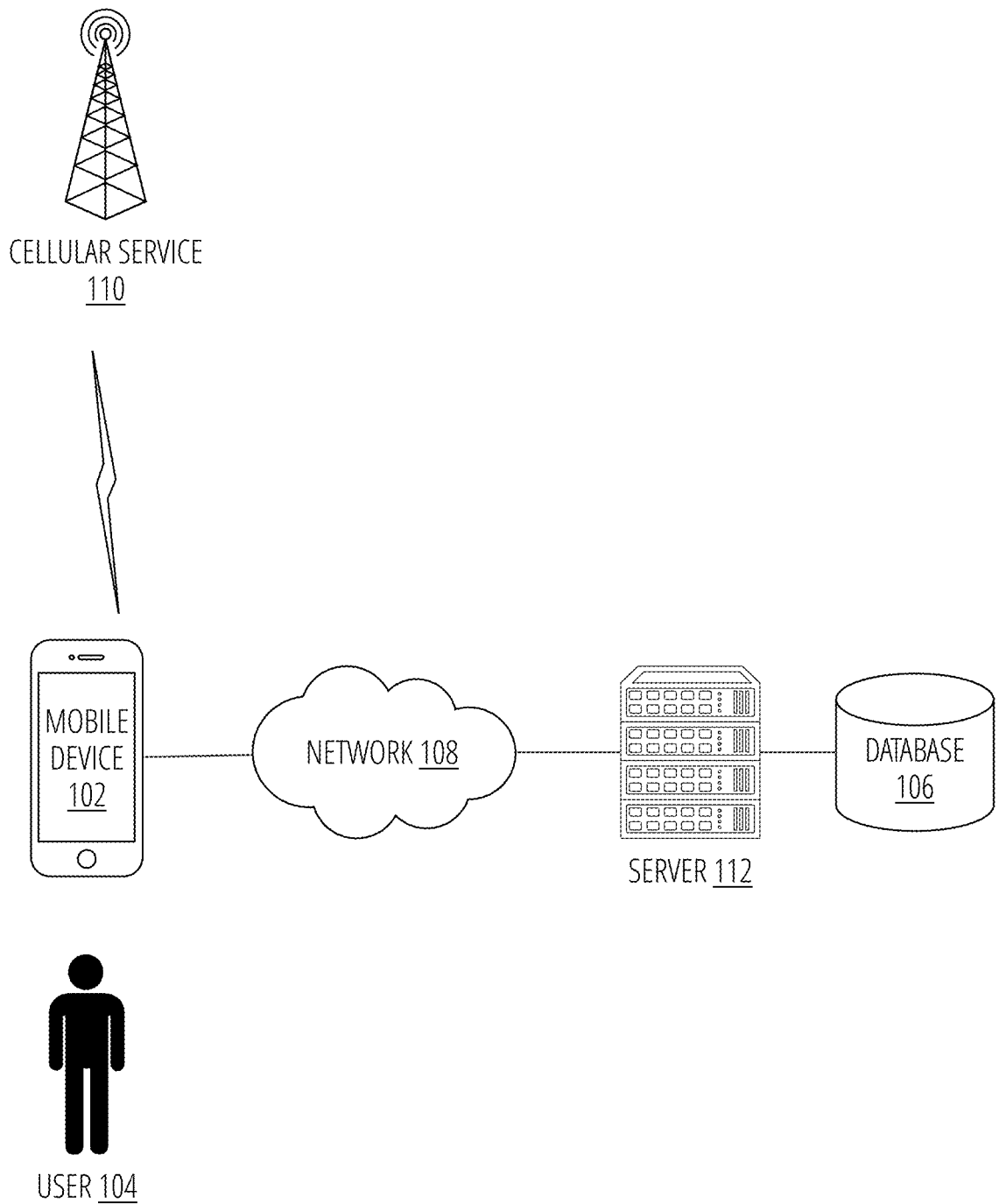
FIG. 1 illustrates a system to monitor the quality of wireless internet service.

FIG. 1 depicts a system to monitor the quality of the wireless internet service. A user 104 uses an application on a mobile device 102 which is connected to the wireless internet service 110 of a service provider. The user can be walking or in a vehicle. When enabled, a wireless internet monitoring application on the mobile device 102 monitors the strength of the wireless internet service 110 received by the mobile device 102 and records the signal strength along with GPS coordinates 114 and time. The monitoring data is sent to an analysis software on a server 112 and stored in a database 106. The monitoring is done at regular intervals. The intervals can be set in time or change in GPS coordinates. The interval frequency can change based on the speed at which the user 104 is moving (for example, the monitoring is less frequent if the user is walking than if the user is moving by car).

When several users are using the wireless internet monitoring application, their data is consolidated to provide a detailed an accurate map of the wireless internet service quality for a given service provider.

The wireless internet monitoring application can be embedded in other applications such as applications that monitor the road traffic conditions. In this case the road traffic conditions can be displayed in combination with the wireless internet service quality.

Figure 2:
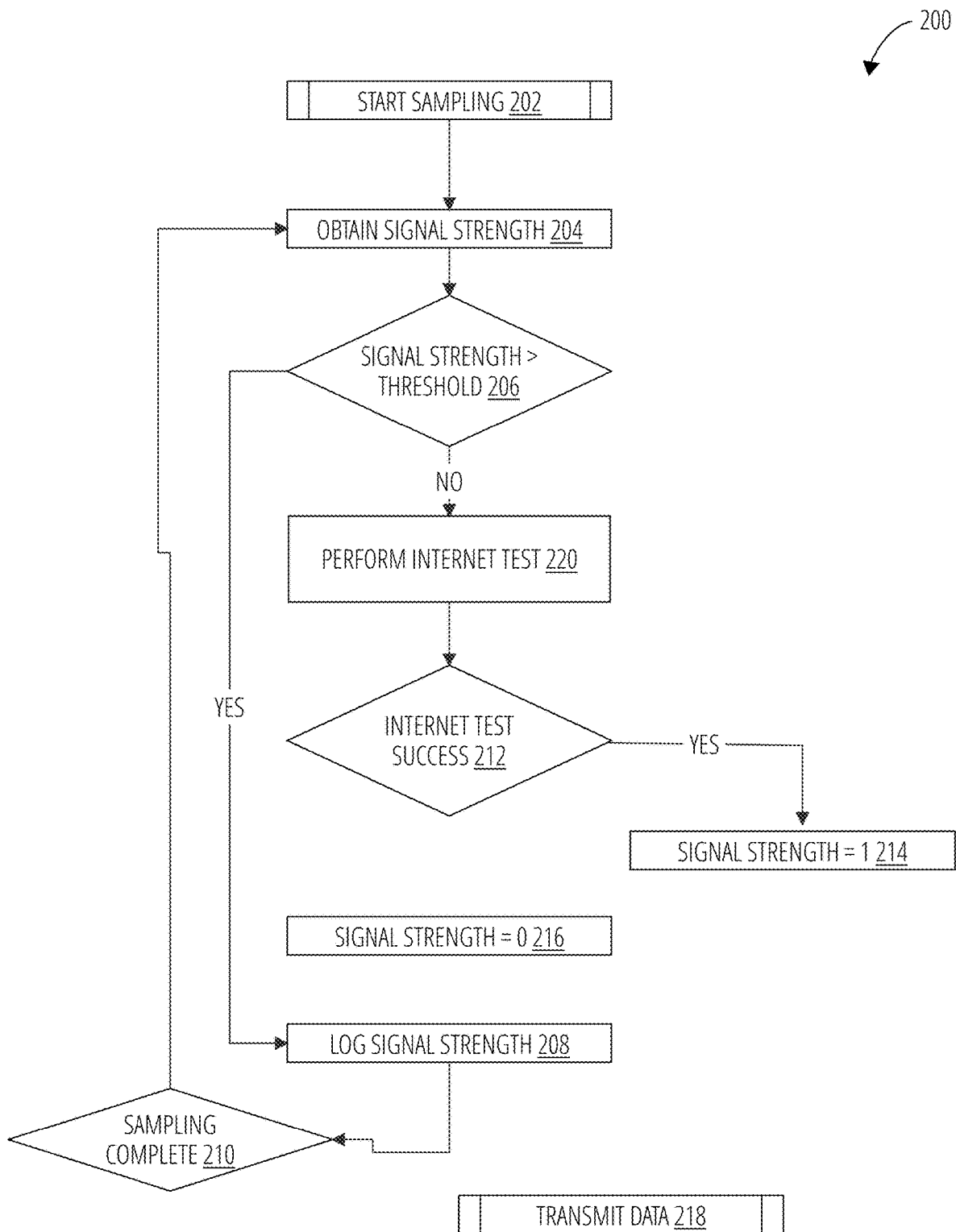
FIG. 2 illustrates an embodiment to monitor the wireless internet data quality.

FIG. 2 depicts one embodiment of the system. The wireless internet monitoring application starts a sampling period. The beginning of the sampling period can be triggered by the user or automatically triggered when the user moves at least at a predetermined speed.

During a sampling period, the application captures the signal strength received by the mobile device 102. The information is obtained through the operating system 204 of the mobile device 102. Signal strength is generally a number from 0 to 5. However, any relative representation of signal strength could be used. If the signal strength is greater than a threshold 206, the signal strength is logged along with the current GPS coordinates.

If the signal strength is lower than a threshold 206 but greater than zero, an internet test is performed 220 to establish whether internet connectivity can be achieved. The internet test may consist for example in having the application access an internet page (e.g. Google.com), if this is successful, that means basic internet is available. The application then reaches the backend application on the server to get a response and validate viable wireless internet capacity when the backend application responds. If the access to the internet or the backend response is not available the internet test is not a success and the signal strength is set to zero. Any other means of testing whether the internet is accessible known in the art can be used.

Since at least two wireless internet signal sources can be available on a mobile device (via the cellular interface and via the WIFI interface), the system can optionally monitor both signals strength and provide two heat maps representing the signal strength for both types of signals or one heat map showing both signal strength.

The signal strength is logged along with the GPS signals 208 and the time of day.

The sampling can continue for a predetermined number of samples or it can be done for a predetermined duration of time or it can continue until the user stops the sampling manually. When the sampling is complete 210, the sampling data is transmitted to the backend application on the server 112 for analysis. The transmission of the sampling data can be done automatically or triggered by the user 104.

FIG. 3 depicts the backend application process. When the sampling data is received it is merged with other data for the same service provider 304. A heat map is created based on the new data to show wireless internet strength (see FIG. 4 as example). Any mapping software known in the art can be used in the background.

When the data is merged, the backend application may optionally extract outliers as compared to previous data obtained by the system. The backend application may also optionally age some previous data and replace with the newer data. Optionally, the backend application merges the information by averaging the signal strengths measured by two or more users in a similar location radius.

The user of the wireless internet monitoring application pulls relevant heat maps to see where wireless internet service 110 is available and at what quality.

Figure 4:
FIG. 4 illustrates a heat map of wireless reception strength.

FIG. 4 illustrates an example of a heat map showing the strength of the wireless internet reception as a function of GPS coordinate. The map can be zoomed, and any other mapping functions known in the art can be used. The user can search for the closest location with wireless internet service of a specific strength.

Figure 5:
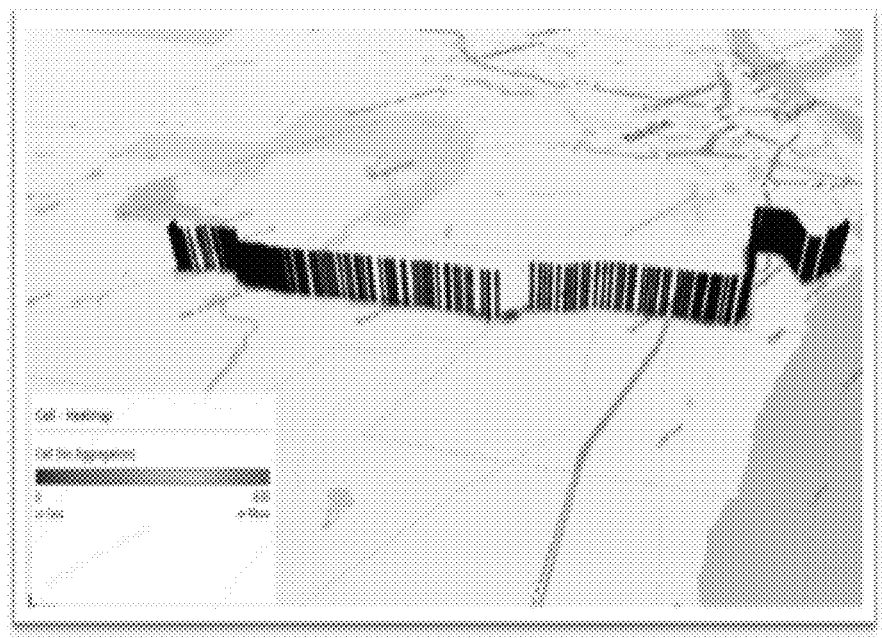
FIG. 5 illustrates the successful samplings.

FIG. 5 illustrated a display of the internet test attempts that were successful using bar graph superimposed on the heat map.

What is claimed is:

1. A collaborative system for monitoring one or more wireless internet signal strength received by a plurality of mobile devices, each subscribed to one of a plurality of service providers comprising:
    an application executed by a processor on each of said plurality of mobile devices recording the strength of said one or more wireless internet signal received at said mobile device along with a GPS coordinates of said mobile device at time of said recording, wherein said application transmits the monitored signal strength along with said GPS coordinates to a backend application;
    said backend application executed by a processor on a server consolidating the monitored signal strength and said GPS coordinates received by said plurality of mobile devices with one or more previously monitored signal strength and GPS coordinates relating to one of said service provider of said mobile device and preparing one or more geographical map of the monitored signal strength to be displayed by the application on the mobile device screen relating to said service provider.

2. The wireless internet monitoring system of claim 1 wherein said application performs an internet test to evaluate internet connectivity when said monitored signal strength is below a predetermined threshold.

3. The wireless internet monitoring system of claim 2 wherein said internet test comprises accessing a web page and accessing an application on the backend and receiving a response.

4. A method for monitoring a wireless internet signal strength received by a plurality of mobile devices, each subscribed to one of a plurality of service providers comprising:
    recording, by an application executed on each of said plurality of mobile devices, the strength of said wireless internet signal received at said mobile device along with a GPS coordinates of said mobile device at time of said recording;
    transmitting, by said application, the monitored signal strength along with said GPS coordinates to a backend application executed on a server;
    consolidating, by said backend application, the monitored signal strength and said GPS coordinates with one or more previously monitored signal strength and GPS coordinates relating to said service provider of said mobile device; and
    presenting a geographical map of the monitored signal strength on the screen of the mobile device relating to said service provider.

5. The method of claim 4 further comprising performing, by application, an internet test to evaluate internet connectivity when said monitored signal strength is below a predetermined threshold.

6. The method of claim 5 wherein said internet test further comprises accessing a web page and accessing an application on the backend and receiving a response.

* * * * *